United States Patent
Mielenz

(10) Patent No.: US 10,409,290 B2
(45) Date of Patent: Sep. 10, 2019

(54) VALET PARKING METHOD AND VALET PARKING SYSTEM

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 15/538,811

(22) PCT Filed: Jan. 19, 2016

(86) PCT No.: PCT/EP2016/050959
§ 371 (c)(1),
(2) Date: Jun. 22, 2017

(87) PCT Pub. No.: WO2016/120119
PCT Pub. Date: Aug. 4, 2016

(65) Prior Publication Data
US 2017/0351267 A1  Dec. 7, 2017

(30) Foreign Application Priority Data

Jan. 26, 2015 (DE) .......................... 10 2015 201 209

(51) Int. Cl.
*G05D 1/02* (2006.01)
*H04N 13/204* (2018.01)
(Continued)

(52) U.S. Cl.
CPC ........... *G05D 1/0289* (2013.01); *B60W 30/06* (2013.01); *E04H 6/422* (2013.01); *G05D 1/0212* (2013.01);
(Continued)

(58) Field of Classification Search
CPC .................................................. G05D 1/0289
See application file for complete search history.

(56) References Cited

U.S. PATENT DOCUMENTS

| 8,897,913 | B2 | 11/2014 | Luo |
| 2010/0156672 | A1 | 6/2010 | Yoo et al. |

(Continued)

FOREIGN PATENT DOCUMENTS

| DE | 112005002323 T5 | 8/2008 |
| DE | 102011108662 A1 | 1/2013 |

(Continued)

OTHER PUBLICATIONS

International Search Report dated Apr. 21, 2016, of the corresponding International Application PCT/EP2016/050959 filed Jan. 19, 2016.

*Primary Examiner* — Jefferey F Harold
*Assistant Examiner* — Justin B Sanders
(74) *Attorney, Agent, or Firm* — Norton Rose Fulbright US LLP; Gerard Messina

(57) ABSTRACT

A method for automatically transporting a vehicle from a transfer zone to an assigned parking space within a predefined parking facility with the aid of a parking facility monitoring system including at least one stationary sensor unit, and pieces of information about the present vehicle position being transmitted to a central control unit. Certain areas of the parking facility are monitored by the sensor units with high accuracy, and other areas of the parking facility are monitored by the sensor units with lesser accuracy, overlapping areas of trajectories of other vehicles with a trajectory being determined by the central control unit, and the trajectory being adapted in such a way that an overlapping area ends up in an area of the parking facility which is monitored by the sensor units with high accuracy.

11 Claims, 2 Drawing Sheets

(51) Int. Cl.
*B60W 30/06* (2006.01)
*G08G 1/16* (2006.01)
*G06T 7/70* (2017.01)
*G06K 9/00* (2006.01)
*G08G 1/14* (2006.01)
*H04N 5/247* (2006.01)
*E04H 6/42* (2006.01)

(52) U.S. Cl.
CPC ..... *G06K 9/00771* (2013.01); *G06K 9/00785* (2013.01); *G06K 9/00791* (2013.01); *G06T 7/70* (2017.01); *G08G 1/146* (2013.01); *G08G 1/164* (2013.01); *H04N 5/247* (2013.01); *H04N 13/204* (2018.05); *G05D 2201/0213* (2013.01); *G06T 2207/30232* (2013.01); *G06T 2207/30236* (2013.01); *G06T 2207/30241* (2013.01); *G06T 2207/30264* (2013.01); *G08G 1/143* (2013.01)

(56) References Cited

U.S. PATENT DOCUMENTS

| | | | |
|---|---|---|---|
| 2012/0188100 A1* | 7/2012 | Min | G08G 1/143 340/932.2 |
| 2013/0024103 A1* | 1/2013 | Schneider | B60W 40/04 701/301 |
| 2013/0113936 A1* | 5/2013 | Cohen | G07B 15/02 348/148 |
| 2013/0231824 A1 | 9/2013 | Wilson et al. | |

FOREIGN PATENT DOCUMENTS

| | | |
|---|---|---|
| DE | 102012016800 A1 | 2/2014 |
| DE | 102012021282 A1 | 4/2014 |

\* cited by examiner

VALET PARKING METHOD AND VALET PARKING SYSTEM

FIELD

The present invention relates to a valet parking method and to a valet parking system for automatically transporting vehicles to a parking spot assigned to the particular vehicle within a predefined parking facility.

BACKGROUND INFORMATION

A valet parking method or a valet parking system is, in particular, to be understood to mean a method or a system in which a driver of a vehicle is able to drop it off in a predetermined drop-off spot, whereupon the vehicle is parked in an automated manner or by service staff and made available to the driver again on request or schedule. The present invention specifically relates to a valet parking method and to a valet parking system in which vehicles are parked by an automated system. The vehicles move autonomously, i.e., without assistance by a human driver, to an assigned parking spot and back to a pick-up position.

Valet parking systems are fully automatic driver assistance systems for parking facilities which, usually by communicating with a central control unit, e.g., a parking facility management system (server), make it possible to drive a vehicle from an entrance area of a parking facility to a parking area without the action of a driver in order to permanently park the vehicle there. The advantage of valet parking systems is that, in contrast to automatic parking facilities including conveying systems, existing facilities do not have to be further equipped to afford the driver the increased convenience of freeing him or her from the search for a parking spot. Furthermore, systems are known which allow the driver to call his or her vehicle over a distance, so that it returns to a pick-up area fully automatically, where the driver may take charge of it.

German Patent Application No. DE 10 2012 021 282 A1 describes a method for coordinating the operation of motor vehicles driving in a fully automated manner. A trajectory is ascertained for each motor vehicle from host vehicle information and surroundings information of the motor vehicle. Thereafter, it is ascertained whether at least one coordination condition is present. A coordination condition is present, for example, when a bottleneck occurs. Trajectory data are exchanged between the motor vehicles via a communication link. This is followed by a check of the trajectory data of the motor vehicles for conflicts which are present due to a spatial and temporal overlap of the trajectories of at least two of the motor vehicles and/or due to at least one of the motor vehicles not reaching the target position. If a conflict is present, an adaptation of the trajectory of at least one of the motor vehicles involved in the conflict takes place.

Moreover, conventional variants of valet parking systems shift essential tasks of surroundings detection into the parking garage infrastructure and, in this way, implement a "remote control" of a vehicle in that the trajectory from the starting position to the target position is calculated by the central control unit and transmitted to the vehicle. The vehicle subsequently follows this trajectory under control of the central control unit, the progress being tracked with the aid of the localization by the infrastructure-bound surroundings sensors and possible present odometry.

U.S. Pat. Appl. No. US2010/0156672 A1, for example, describes a method for autonomously parking a vehicle in a parking area including a plurality of parking spaces. With the aid of sensors provided on the parking area, a parking space for the vehicle is ascertained from the plurality of parking spaces. A position and a movement of the vehicle are detected by guide sensors on the parking area. A trajectory is created based on a present position of the vehicle and based on pieces of information with respect to the ascertained parking space and transmitted to the vehicle. The trajectory is modified when an obstacle appears on the trajectory of the vehicle.

German Patent Application No. DE 10 2012 016 800 A1 describes a method for ascertaining a vehicle position of a vehicle to be localized within a predefined driving area in mapped surroundings, the vehicle position being determined by an evaluation of position data of at least one predetermined component of the vehicle, and the position data being provided by, in particular, a plurality of position detection sensors fixedly situated within the mapped surroundings. The present invention also relates to a corresponding device for ascertaining a vehicle position. In this way, for example, piloted driving in a parking garage is possible.

The present invention is directed to automatic valet parking systems including infrastructure-bound sensor systems, the associated sensors being used to localize the vehicles driving autonomously (hereafter also referred to as "AVP vehicles") within a predefined parking facility managed by the valet parking system, and to synchronize their positions, in particular based on an existing digital map. With such systems, it is important from an economic perspective to minimize the number of surroundings sensors in order to enable a cost-effective system implementation. However, in some circumstances it is no longer ensured that it is always possible to localize the AVP vehicles with the necessary accuracy. The risk exists that higher deviations may arise in following the particular trajectory since it is necessary, in particular in areas which are detected by the sensors with a reduced accuracy, to resort to odometry that is subject to drift in order to localize the vehicle.

Within areas in which it is not possible to carry out the localization with sufficient accuracy due to lesser coverage of the areas traveled by the vehicle by the surroundings sensors, or due to higher measuring errors which may be caused, e.g., by a large distance of the AVP vehicle from the sensor, or by the detection range being obstructed by parked vehicles, the vehicle odometry is integrated into the process to track movements of the vehicle within the parking facility, e.g., on a digital map. Since the odometry is usually subject to measuring errors, which result in a drift effect in the anticipated vehicle position, in particular narrow passageways of a parking garage are still only able to be negotiated with high collision risk. This risk is further intensified when the trajectory planning of a central control unit shifts the overlapping area of the trajectories of two vehicles which are being autonomously moved simultaneously within the parking facility into an area which is subject to a high uncertainty with respect to the vehicle localization.

SUMMARY

It is an object of the present invention to improve a valet parking system to the effect that the risk of a collision between vehicles encountering one another is reduced. This may be achieved by a valet parking system in accordance with an example embodiment of the present invention.

The present invention makes it possible that multiple vehicles having an automated valet parking function are simultaneously able to autonomously negotiate a parking facility intended for this purpose, such as a parking garage, in a safe and collision-free manner. In accordance with the present invention, overlapping areas of the trajectories, in particular so-called points of encounter, are planned by a central control unit in locations in which infrastructure-bound sensors have high localization accuracy.

Autonomously or automatically within the context of the present invention means in particular that the vehicle navigates independently, i.e., without an intervention of a driver. The vehicle thus drives independently along a trajectory, without a driver having to steer the vehicle for this purpose. Guiding includes in particular transverse and/or longitudinal guidance of the vehicle. During autonomous driving or navigation, the driver thus does not personally have to be in the vehicle.

According to a first aspect of the present invention, a valet parking system is provided for automatically transporting a vehicle from a transfer zone to an assigned parking space within a predefined parking facility and for automatically unparking and transporting the vehicle to a pick-up zone. The valet parking system includes a central control unit, for example a server, and a parking facility monitoring system including at least one stationary sensor unit, a so-called infrastructure-bound sensor unit. The central control unit is able to receive and process data of the sensor units to obtain pieces of information therefrom about the vehicles which are presently moved autonomously within the parking facility. The central control unit is furthermore preferably designed to manage the parking spaces of the parking facility and assign these to arriving vehicles, and to initiate a pick-up process at the request of a driver or based on other criteria, such as a previously established pick-up time, a certain event, or the schedule of a public means of transportation.

The parking facility monitoring system is designed to localize the vehicles driving within the predefined parking facility and to transmit pieces of information about the present vehicle position to the central control unit. For this purpose, the central control unit and the vehicle each include, in particular, an appropriate communication interface.

The central control unit is designed to transmit pieces of information to the vehicle, for example via a wireless data link, so that the vehicle may be autonomously guided along a trajectory within the parking facility based on the pieces of information, for example from the transfer zone to the assigned parking space or from the parking space to the pick-up zone. The trajectory may preferably be calculated by the central control unit and transmitted to the vehicle.

According to the present invention, the valet parking system is designed in such a way that the sensor units are situated in such a way that it is possible for the sensor units to monitor certain areas of the parking facility with high accuracy, and for the sensor units to monitor other areas of the parking facility with lesser accuracy. The central control unit is configured to determine overlapping areas of trajectories of other vehicles with the trajectory and to adapt the trajectory in such a way that an overlapping area ends up in an area of the parking facility which is monitored by the sensor units with high accuracy.

Preferably, points of encounter are defined within the areas of the parking facility which are monitored by the sensor units with high accuracy, and the central control unit is configured to adapt the trajectory in such a way that an overlapping area ends up in an area of such a point of encounter.

This advantageously achieves an avoidance of collisions between AVP vehicles which are being moved simultaneously within the parking facility in that, in particular, designated locations or areas are provided in which the vehicles encounter or come close to one another ("points of encounter"). These designated locations or areas are detected by at least one sensor unit of the parking facility monitoring system with high accuracy, so that the central control unit is able to transmit precise pieces of information to the vehicles encountering one another, and the trajectories of one vehicle or of both vehicles encountering one another may be determined in such a way that a collision is prevented. If the trajectory planning were to provide the overlapping area or the points of encounter of two vehicles in an area, for example, for which only a very imprecise localization (or none at all) is possible with the aid of the infrastructure-bound sensor units, the odometry drift and the resultant deviation between the actual vehicle position and a calculated vehicle position on the trajectory could result in a collision between the vehicles.

In one preferred embodiment of the present invention, it is provided that the pieces of information transmitted from the central control unit to the vehicle include pieces of path information and/or pieces of speed information and/or pieces of steering information and/or pieces of stop and start information. A trajectory ascertained from these pieces of information includes, in particular, not only a path along which the vehicle moves within the parking facility, but additionally includes temporal components. This is advantageous since it is also possible to take into consideration whether the trajectories overlap not only spatially, but also temporally in the determination of overlapping areas of trajectories of two AVP vehicles. If, for example, only a spatial overlap, but no temporal overlap is present, an adaptation of the trajectories may not be necessary since no collision risk exists. In particular, in the case of a spatial and a temporal overlap, it is possible to easily adapt the trajectories, for example by changing the speed along the path and/or by inserting stopping points at which the vehicle waits for a certain time.

In one further preferred embodiment of the present invention, at least one sensor unit of the parking facility monitoring system is designed as a 2D video camera system or as a 3D video camera system, which, in particular, implements an object identification function and/or an object tracking function. In one alternative variant, the object identification function and/or the object tracking function may also be implemented on the central control unit.

The central control unit is preferably configured to adapt the trajectory in an overlapping area with the trajectory of another vehicle in such a way that collisions with other vehicles are prevented, the trajectory being continuously adapted based on pieces of surroundings information detected by one or multiple sensor units, in particular pieces of image information containing identified objects.

High accuracy of the monitoring and, in particular, high accuracy of the detected pieces of surroundings information, may preferably be understood to mean that pieces of surroundings information of the corresponding areas of the parking facility are available in a higher spatial resolution and/or a higher time resolution and/or a higher image contrast than in the areas of the parking facility which are monitored by the sensor units with lesser accuracy.

In one particularly preferred embodiment of the present invention, additionally pieces of surroundings information are detected by surroundings detection sensors on the vehicle and transmitted from the vehicle, for example wirelessly, to the central control unit. These additional pieces of surroundings information may be taken into consideration, in particular, in the adaptation of the trajectory to avoid collisions in overlapping areas.

In one further preferred embodiment of the present invention, the central control unit includes a memory unit on which a 2D or a 3D map of the predefined parking facility is digitally stored. This digital map includes pieces of information about areas of the parking facility which are monitored by the sensor units with high accuracy, areas of the parking facility which are monitored by the sensor units with lesser accuracy, available parking areas, drivable traffic lanes, traffic rules, and present positions of vehicles. The map is preferably continuously updated with pieces of information detected by the sensor units and, if necessary, updated with pieces of information detected by surroundings sensors on the vehicles. In this embodiment, the central control unit is designed to determine trajectories for the vehicles based on the map and to adapt these, when overlapping areas occur, in such a way that, according to the present invention, the overlapping areas end up in an area of the parking facility which is monitored by the sensor units with high accuracy.

According to a second aspect of the present invention, a parking facility is provided which includes a valet parking system designed as described above. A parking facility within the meaning of the present invention may be any facility which is suitable for parking vehicles. The parking facility may, for example, be a parking area outdoors or inside a building including a multitude of designated parking spots, or a parking garage including multiple levels or a facility including a multitude of individual garages.

According to a third aspect of the present invention, a method for automatically transporting a vehicle from a transfer zone to a designated parking space within a predefined parking facility and for automatically unparking and transporting the vehicle to a pick-up zone is provided, the vehicles driving within the predefined parking facility being localized with the aid of a parking facility monitoring system including at least one stationary sensor unit, and pieces of information about the present vehicle position being transmitted to a central control unit. The central control unit transmits pieces of information to the vehicle so that the vehicle may be autonomously guided along a trajectory within the parking facility based on the pieces of information.

According to the present invention, it is provided that the sensor units are situated in such a way that certain areas of the parking facility are monitored by the sensor units with high accuracy, and other areas of the parking facility are monitored by the sensor units with lesser accuracy, overlapping areas of trajectories of other vehicles with the trajectory being determined by the central control unit, and the trajectory being adapted in such a way that an overlapping area ends up in an area of the parking facility which is monitored by the sensor units with high accuracy.

The method according to the present invention thus provides for the described overlapping areas and, in particular, the points of encounter of the vehicles, to be planned only in areas in which a localization may be ensured with sufficiently high accuracy by the infrastructure-bound sensors.

According to a further aspect of the present invention, a computer program is provided, which includes program code for carrying out the method according to the present invention if the computer program is executed on a computer.

Compared to the related art, the present invention offers the advantages that the number of infrastructure-bound sensors may be kept low, whereby system costs may be saved and the collision risk for AVP vehicles encountering one another is considerably reduced, allowing multiple AVP vehicles to be moved simultaneously within the parking facility, and the efficiency of the valet parking system according to the present invention to be improved compared to the related art.

The figures only schematically represent the subject matter.

DETAILED DESCRIPTION OF EXAMPLE EMBODIMENTS

Figure 1:
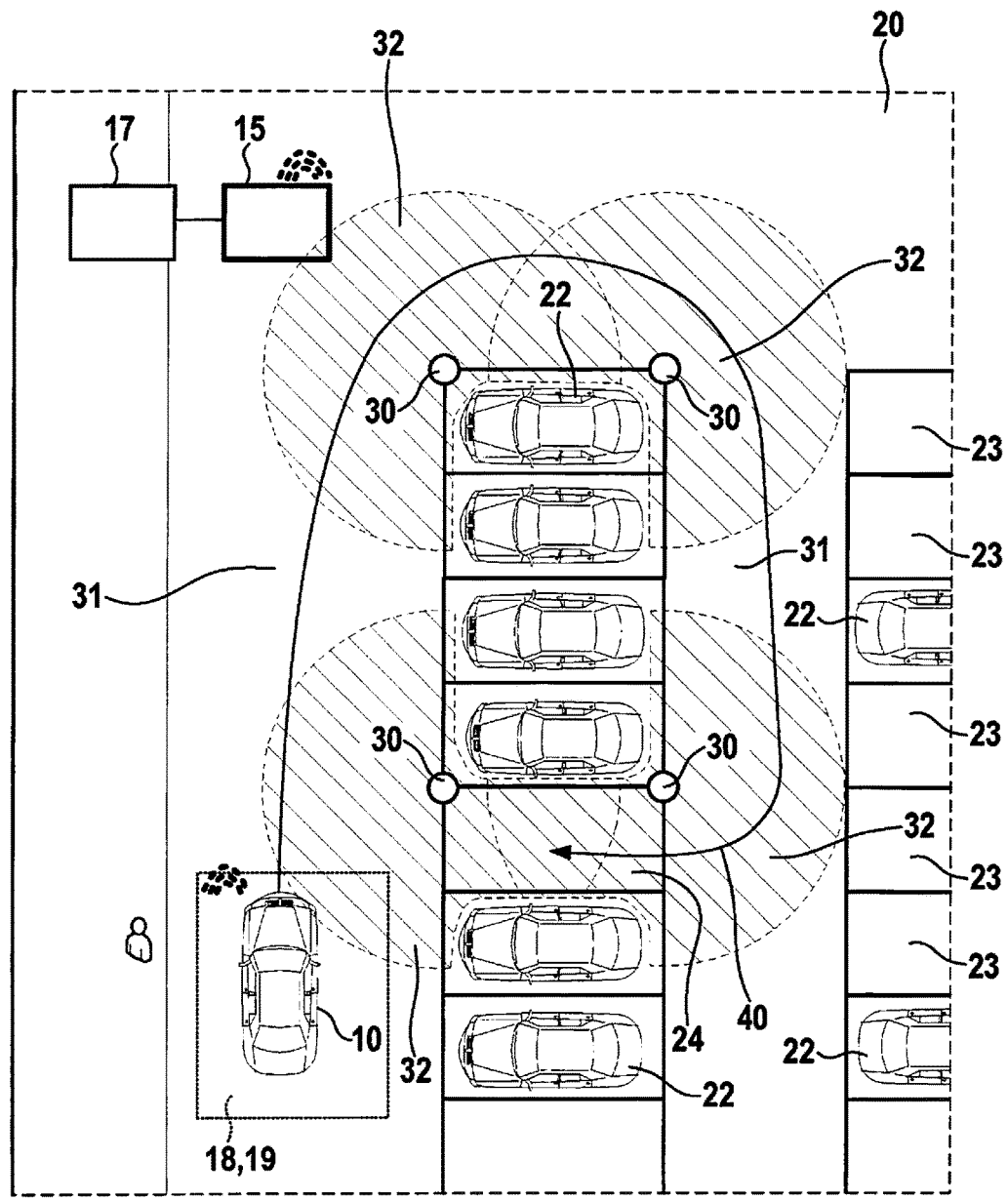
FIG. 1 shows a parking facility including a valet parking system, and a vehicle which moves autonomously within the parking facility along a trajectory.

FIG. 1 shows a parking facility 20 including a plurality of parking spaces 23 in a schematic top view. The schematic illustration shows a parking facility 20 as an open area, it also being possible to apply the present invention to parking garages, blocks of garages and underground parking garages.

The parking facility 20 includes a transfer zone 18, in which a vehicle 10 may be transferred to the operator of parking facility 20. For this purpose, the driver of vehicle 10 drives his/her vehicle 10 to transfer zone 18, leaves his/her vehicle 10, and transfers his/her vehicle 10 to the operator of parking facility 20.

To monitor vehicle 10 while it is moving within parking facility 20, a parking facility monitoring system which includes a multitude of sensor units 30 designed as cameras is assigned to parking facility 20. The spatial arrangement of sensor units 30 and the limited detection area of each sensor unit 30, and possibly vehicles obstructing the detection area, result in areas 32 which are detected, i.e., monitored, by sensor units 30 with high accuracy, and areas 31 which are detected, i.e., monitored, with lesser accuracy. Sensor units 30 are preferably situated distributed in parking facility 20 in such a way that vehicle 10 is always in the field of view of at least one sensor unit 30. Sensor units 30, e.g., 360° video cameras, installed in a stationary manner within the parking facility, include an object identification and tracking functionality. In one alternative variant, the object tracking may also be implemented on central control unit 15.

After vehicle 10 has been transferred to the parking facility operator, vehicle 10 is assigned a free parking space 23 out of the possible free parking spaces 24 as parking position by a central control unit 15. Already occupied parking spaces are denoted by reference numeral 22 in FIG. 1.

After having been assigned the parking position, vehicle 10 is moved to assigned free parking space 24. Vehicle 10 is configured to carry out a driving maneuver autonomously with the aid of a parking assistance system. Central control unit 15 is granted access to the parking assistance system, so that vehicle 10 is able to autonomously move on parking facility 20 and automatically navigates to parking position 24. According to the present invention, central control unit 15 transmits corresponding pieces of information to vehicle 10 so that vehicle 10 may be autonomously guided along a trajectory 40 within parking facility 20 based on the pieces of information.

The surroundings data recorded by sensor units 30 are transmitted to central control unit 15. Depending on the embodiment variant, this may take place via cable connections or also wirelessly.

Figure 2:
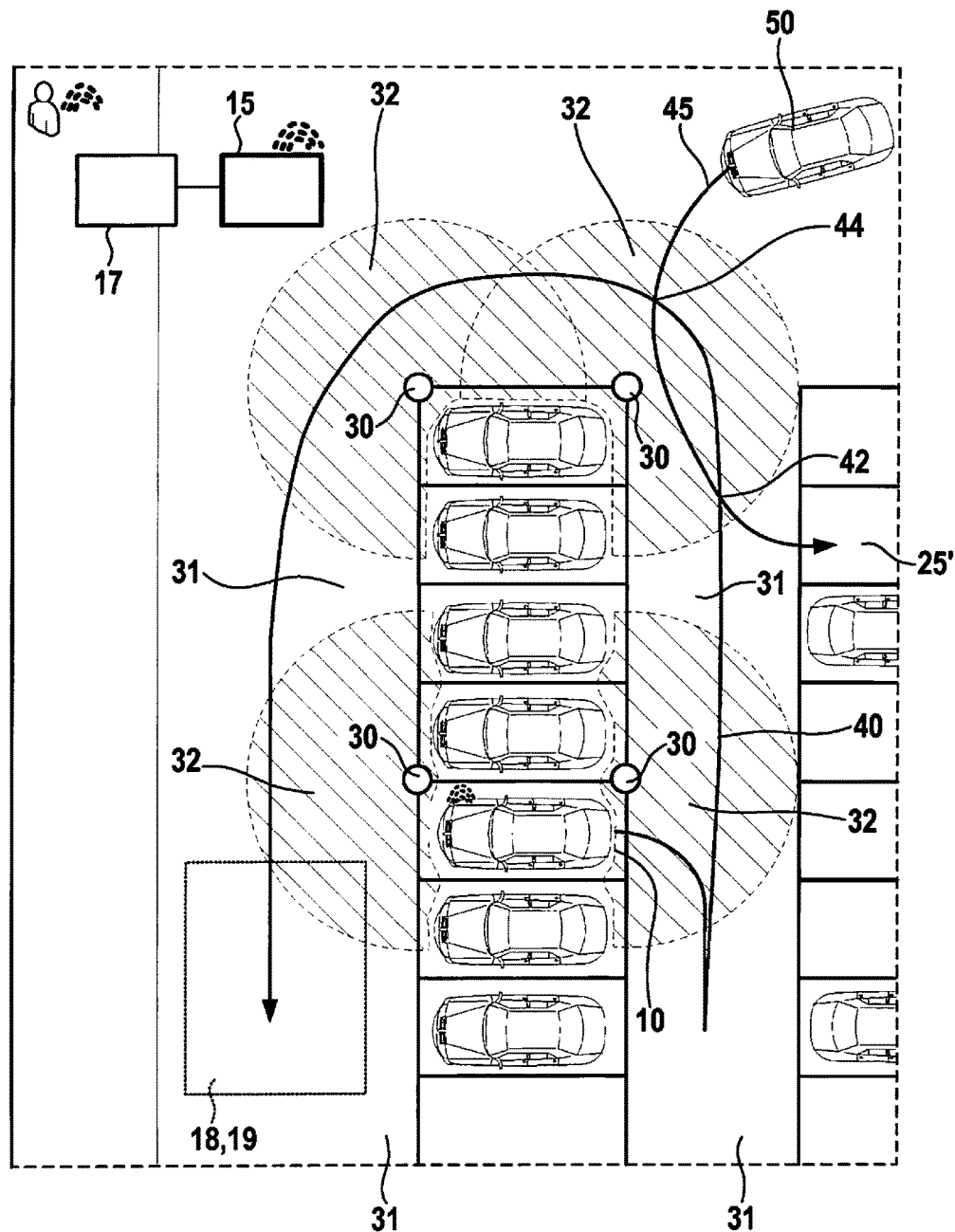
FIG. 2 shows a parking facility including a valet parking system designed according to the present invention, and two vehicles which move autonomously within the parking facility and whose trajectories have an overlapping area.

If the driver intends to pick up his/her vehicle 10 again, the request of the driver is transmitted to the parking assistance system of vehicle 10 by central control unit 15. It is also possible to transmit pieces of information, such as the position of the desired pick-up zone 19. The vehicle thereupon automatically navigates to pick-up zone 19, moving along a trajectory 40. This situation is shown in FIG. 2. In the depicted exemplary embodiment, transfer zone 18 and pick-up zone 19 coincide. Alternatively, for example, spatially separate transfer zones and pick-up zones may be provided.

In the situation shown in FIG. 2, in addition to vehicle 10 another vehicle 50 is traveling autonomously within parking facility 20. In this example, vehicle 50 navigates to parking spot 25 to which it was assigned by central control unit 15. Vehicle 50 moves along a trajectory 45 for this purpose. This results in an overlapping area 42 of trajectories 40 and 45. To avoid collisions of vehicles 10 and 50 in this overlapping area, a sensor unit 30 should detect this overlapping area with high accuracy. In the present example, overlapping area 42, however, coincides with an area 31 which is monitored by sensor units 30 with lesser accuracy. For this reason, at least one of trajectories 40 and 45 is adapted by central control unit 15 in such a way that overlapping area 44 forms in an area 32 of parking facility 20 which is detected and monitored by at least one sensor unit 30 with high accuracy. In the illustrated example, this is achieved in that vehicle 50 waits, i.e., trajectory 45 is adapted by insertion of a time delay, until overlapping area 44 forms in an area 32 of parking facility 20 which is detected and monitored by at least one sensor unit 30 with high accuracy. As an alternative or in addition, trajectory 40 may also be appropriately adapted by a change in the speed and/or the path so that an overlapping area with trajectory 45 forms in an area 32 of parking facility 20 which is detected and monitored by at least one sensor unit 30 with high accuracy.

To adapt trajectories 40 and/or 45, central control unit 15 in this exemplary embodiment includes a memory unit 17, on which a digital map of predefined parking facility 20 is stored. This digital map includes pieces of information about the positions of sensor units 30 used to localize vehicles 10, 50 on parking facility map. In addition, the map includes the positions of areas 32 of parking facility 20 which are monitored by sensor units 30 with high accuracy, and about the positions of areas 31 of the parking facility which are monitored by sensor units 30 with lesser accuracy.

Furthermore, the map may include pieces of information about occupied and available parking areas, drivable traffic lanes, traffic rules and present positions of vehicles parking or driving or waiting within parking facility 20. The map is continuously updated with pieces of surroundings information detected with the aid of sensor units 30 and, if necessary, additionally with pieces of information detected by surroundings sensors on vehicles 10, 50. In one preferred embodiment, it is possible to expand the map with knowledge of the imprecision to be expected of a position ascertainment of a vehicle as a function of the x,y coordinate. In this way, it is possible to divide the map not only into areas 32 of a highest possible accuracy of detection by sensor units 30 and into areas 31 of a lowest possible accuracy of detection by sensor units 30, but also to provide further levels in the accuracy of the detection by sensor units 30.

In this embodiment, central control unit 15 is designed to determine initial trajectories 40, 45 for vehicles 10, 50 based on the map and to adapt these, when overlapping areas occur, in such a way that, according to the present invention, the overlapping areas end up in an area 32 of parking facility 20 which is monitored by sensor units 30 with high accuracy.

Central control unit 15 preferably implements a software for ascertaining the trajectory of an AVP vehicle 10 from a starting location to a destination, such as from a parking space 24 to a pick-up zone 19. A trajectory 40 describes the path to be driven of a designated reference point of vehicle 10 (e.g., the rear axle center point) in x,y coordinates relative to an established coordinate system of parking facility 20, and the respective speed of vehicle 10 to be set as a function of its position on the path. According to the present invention, the software checks whether individual trajectories of at least two vehicles 10, 50 have an overlapping area 42. For this purpose, it is ascertained whether trajectories 40 and 45 have a geometric point of encounter. It is not absolutely necessary for this purpose that an intersecting point of trajectories 40 and 45 in fact exists; instead, it may be sufficient that the distance between trajectories 40 and 45 drops below a defined minimum distance at least once. The minimum distance may be defined as a function of the involved vehicle types, for example. Should this apply, it is ascertained with the aid of the also present time information whether the vehicles will also encounter one another from the perspective of time. Should this be the case, trajectory 40, 45 of one or both vehicles 10, 50 is temporally or geometrically adapted with the aid of a suitable optimization strategy in such a way that the adapted overlapping area 44, or in other words the point of encounter in space and time, is situated in an area 32 of high localization accuracy. Central control unit 15 may preferably include a data processing device, which carries out or supports the above-mentioned tasks.

In one exemplary first variant, it may be ascertained, proceeding from the initially ascertained point of encounter, where along the shared trajectory high localization accuracy exists. The speeds or the intended paths of affected vehicles 10 and 50 are adapted in such a way that this goal is achieved.

The present invention is not limited to the exemplary embodiments described here and the aspects highlighted therein. Rather, a plurality of modifications is possible within the scope of the present invention, which are within the capabilities of those skilled in the art.

What is claimed is:

1. A valet parking system for automatically transporting a vehicle from a transfer zone to an assigned parking space within a predefined parking facility and for automatically unparking and transporting the vehicle to a pick-up zone, comprising:
    a central control unit; and
    a parking facility monitoring system including at least one stationary sensor unit, the parking facility monitoring system being configured to localize the vehicles driving within the predefined parking facility and to transmit pieces of information about the present vehicle position to the central control unit;
    wherein the central control unit is configured to transmit pieces of information to the vehicle so that the vehicle is autonomously guidable along a trajectory within the parking facility based on the pieces of information, wherein the at least one stationary sensor unit includes sensor units situated so that certain areas of the parking facility are monitored by the sensor units with high accuracy, and other areas of the parking facility are monitored by the sensor units with lesser accuracy, wherein the central control unit is configured to determine overlapping areas of trajectories of other vehicles with the trajectory and to adapt the trajectory so that an overlapping area ends up in an area of the parking facility which is monitored by the sensor units with high accuracy, and wherein the central control unit includes a memory unit, a digital map of the predefined parking facility being stored on the memory unit which includes pieces of information about areas of the parking facility which are monitored by the sensor units with high accuracy, areas of the parking facility which are monitored by the sensor units with lesser accuracy, and the map being continuously updated with pieces of information detected by the sensor units, and the central control unit being configured to determine and adapt trajectories based on the digital map.

2. The valet parking system as recited in claim 1, wherein points of encounter are defined within the areas of the parking facility which are monitored by the sensor units with high accuracy, and the central control unit is configured to adapt the trajectory in such a way that an overlapping area ends up in an area of a point of encounter.

3. The valet parking system as recited in claim 1, wherein the pieces of information transmitted from the central control unit to the vehicle include at least one of: (i) pieces of path information, (ii) pieces of speed information, (iii) pieces of steering information, and (iv) stop and start instructions.

4. The valet parking system as recited in claim 1, wherein at least one of the sensor units is one of a 2D video camera system or a 3D video camera system, the least one of the sensor units configured to implement at least one of an object identification function and an object tracking function.

5. The valet parking system as recited in claim 1, wherein the central control unit is configured to adapt the trajectory in an overlapping area in such a way that collisions with other vehicles are prevented, the trajectory being continuously adapted based on pieces of surroundings information detected by at least one of the sensor units.

6. The valet parking system as recited in claim 1, wherein pieces of surroundings information having at least one of a higher spatial resolution, a higher time resolution, and a higher image contrast, are available in the areas of the parking facility which are monitored by the sensor units with higher accuracy than in the areas of the parking facility which are monitored by the sensor units with lesser accuracy.

7. The valet parking system as recited in claim 5, wherein additional pieces of surroundings information are detected by surroundings detection sensors on the vehicle and transmitted from the vehicle to the central control unit, the additional pieces of surroundings information being taken into consideration in the adaptation of the trajectory.

8. The valet parking system as recited in claim 1, wherein the digital map includes a 2D map or a 3D map of the predefined parking facility includes further pieces of information, including, available parking areas, drivable traffic lanes, traffic rules and present positions of the vehicles.

9. A parking facility including a valet parking system, for automatically transporting a vehicle from a transfer zone to an assigned parking space within a predefined parking facility and for automatically unparking and transporting the vehicle to a pick-up zone, comprising:

a central control unit; and a parking facility monitoring system including at least one stationary sensor unit, the parking facility monitoring system being configured to localize the vehicles driving within the predefined parking facility and to transmit pieces of information about the present vehicle position to the central control unit;

wherein the central control unit is configured to transmit pieces of information to the vehicle so that the vehicle is autonomously guidable along a trajectory within the parking facility based on the pieces of information, wherein the at least one stationary sensor unit includes sensor units situated so that certain areas of the parking facility are monitored by the sensor units with high accuracy, and other areas of the parking facility are monitored by the sensor units with lesser accuracy, and wherein the central control unit is configured to determine overlapping areas of trajectories of other vehicles with the trajectory and to adapt the trajectory so that an overlapping area ends up in an area of the parking facility which is monitored by the sensor units with high accuracy, and wherein the central control unit includes a memory unit, a digital map of the predefined parking facility being stored on the memory unit which includes pieces of information about areas of the parking facility which are monitored by the sensor units with high accuracy, areas of the parking facility which are monitored by the sensor units with lesser accuracy, and the map being continuously updated with pieces of information detected by the sensor units, and the central control unit being configured to determine and adapt trajectories based on the digital map.

10. A method for automatically transporting a vehicle from a transfer zone to an assigned parking space within a predefined parking facility and for automatically unparking and transporting the vehicle to a pick-up zone, the method comprising:

localizing, the vehicle driving within the predefined parking facility, with a parking facility monitoring system including at least one stationary sensor unit;

transmitting pieces of information about the present vehicle position to a central control unit, the central control unit transmitting pieces of information to the vehicle so that the vehicle is autonomously guidable along a trajectory within the parking facility based on the pieces of information, wherein the at least one stationary sensor unit includes sensor units situated so that certain areas of the parking facility are monitored by the sensor units with high accuracy, and other areas of the parking facility are monitored by the sensor units with lesser accuracy;

determining, by the central control unit, overlapping areas of trajectories of other vehicles with the trajectory; and adapting the trajectory so that an overlapping area ends up in an area of the parking facility which is monitored by the sensor units with high accuracy, and wherein the central control unit includes a memory unit, a digital map of the predefined parking facility being stored on the memory unit which includes pieces of information about areas of the parking facility which are monitored by the sensor units with high accuracy, areas of the parking facility which are monitored by the sensor units with lesser accuracy, and the map being continuously updated with pieces of information detected by the sensor units, and the central control unit being configured to determine and adapt trajectories based on the digital map.

11. A non-transitory computer readable storage medium on which is stored a computer program, which is executable by a processor, comprising:
a program code arrangement having program code for automatically transporting a vehicle from a transfer zone to an assigned parking space within a predefined parking facility and for automatically unparking and transporting the vehicle to a pick-up zone, by performing the following:
localizing the vehicle driving within the predefined parking facility with a parking facility monitoring system including at least one stationary sensor unit;
transmitting pieces of information about the present vehicle position to a central control unit, the central control unit transmitting pieces of information to the vehicle so that the vehicle is autonomously guidable along a trajectory within the parking facility based on the pieces of information, wherein the at least one stationary sensor unit includes sensor units situated so that certain areas of the parking facility are monitored by the sensor units with high accuracy, and other areas of the parking facility are monitored by the sensor units with lesser accuracy;
determining, by the central control unit, overlapping areas of trajectories of other vehicles with the trajectory; and
adapting the trajectory so that an overlapping area ends up in an area of the parking facility which is monitored by the sensor units with high accuracy, and
wherein the central control unit includes a memory unit, a digital map of the predefined parking facility being stored on the memory unit which includes pieces of information about areas of the parking facility which are monitored by the sensor units with high accuracy, areas of the parking facility which are monitored by the sensor units with lesser accuracy, and the map being continuously updated with pieces of information detected by the sensor units, and the central control unit being configured to determine and adapt trajectories based on the digital map.

* * * * *